United States Patent [19]
Petzold et al.

[11] Patent Number: 6,118,365
[45] Date of Patent: Sep. 12, 2000

[54] PULSE TRANSFORMER FOR A U-INTERFACE OPERATING ACCORDING TO THE ECHO COMPENSATION PRINCIPLE, AND METHOD FOR THE MANUFACTURE OF A TOROIDAL TAPE CORE CONTAINED IN A U-INTERFACE PULSE TRANSFORMER

[75] Inventors: Jörg Petzold, Bruchköbel; Johannes Beichler, Rodgau; Johannes Binkofski, Rodenbach; Giselher Herzer, Bruchköbel; Volker Kieespies, Gelnhausen; Luigi Caprarella, Hammersbach; Holger Wink, Gelnhausen, all of Germany

[73] Assignee: Vacuumschmelze GmbH, Hanau, Germany

[21] Appl. No.: 09/269,015

[22] PCT Filed: Sep. 17, 1997

[86] PCT No.: PCT/DE97/02093

§ 371 Date: Mar. 17, 1997

§ 102(e) Date: Mar. 17, 1999

[87] PCT Pub. No.: WO98/12847

PCT Pub. Date: Mar. 26, 1998

[30] Foreign Application Priority Data

Sep. 17, 1996 [DE] Germany .............. 196 37 881

[51] Int. Cl.[7] .................. H01F 17/04; H01F 1/04
[52] U.S. Cl. .................. 336/221; 336/218; 148/307
[58] Field of Search .................. 336/218, 83, 221; 148/305, 307, 310

[56] References Cited

U.S. PATENT DOCUMENTS

| 4,056,411 | 11/1977 | Chen et al. .............. 148/121 |
| 4,945,339 | 7/1990 | Yamauchi et al. ........... 340/551 |
| 4,985,088 | 1/1991 | Okamura et al. ............. 148/305 |

FOREIGN PATENT DOCUMENTS

| 0 084 138 | 7/1983 | European Pat. Off. . |
| 0 086 485 | 8/1983 | European Pat. Off. . |
| 0 378 823 | 7/1990 | European Pat. Off. . |

OTHER PUBLICATIONS

"Influence of Annealing on the Magnetic Properties of Co–based Amorphous Alloys," Swierczek et al., Journal of Magnetism and Magnetic Materials, vol. 160 (1996), pp. 295–296 (no month).

"Effect of Annealing the Magnetic Properties and Microstructure of Amorphous $Co_{75}Si_{10}B_{15}$," Shaikh et al., Journal of Magnetism and Magnetic Materials, vol. 152 (1996), pp. 345–342 (no month).

"Amorphous Alloy Core Distribution Transformers," Ng et al., Proceedings of the IEEE, vol. 79, No. 11 (Nov. 1991), pp. 1608–1622.

Primary Examiner—Lincoln Donovan
Assistant Examiner—Anh Mai
Attorney, Agent, or Firm—Hill and Simpson

[57] ABSTRACT

In the ISDN telecommunication system, the connection between a digital local exchange and the network termination ensues via a public two-wire line at whose ends what are referred to as U-transformers reside. When the network termination leads to a terminal subscriber, then this is called a $U_{k0}$ interface whereat the line length between the transformers can amount to up to 8 km. The bit error rate of the transmitted pulses must be $<10^{-7}$, whereby the pulses have direct currents for the remote feed of the terminal subscribers that can amount to up to 80 mA superimposed on them. For such $U_{K0}$ transformers, a toroidal tape core of a soft-magnetic, amorphous, magnetostriction-free alloy tape is employed. The manufactured toroidal tape core is tempered in a magnetic field, this thermal treatment ensuing in a protective gas atmosphere.

8 Claims, 4 Drawing Sheets

PULSE TRANSFORMER FOR A U-INTERFACE OPERATING ACCORDING TO THE ECHO COMPENSATION PRINCIPLE, AND METHOD FOR THE MANUFACTURE OF A TOROIDAL TAPE CORE CONTAINED IN A U-INTERFACE PULSE TRANSFORMER

BACKGROUND OF THE INVENTION

1. Field of the Invention

The present invention is directed to a pulse transformer for U-interfaces according to the echo compensation principle and to a method for the manufacture of a toroidal tape core contained in pulse transformers for U-interfaces.

2. Description of the Prior Art

In a digital telecommunication system, particularly an ISDN telecommunication system, the connection between a digital local exchange and the network termination ensues via a public two-wire line at whose ends what are referred to as $U_{K0}$ or $U_{HDSL}$ reside. A schematic view of such an ISDN telecommunication system is shown in FIG. 1. Such an ISDN telecommunication system is composed of a network termination (NTBA1), of an ISDN local exchange 2, a $U_{K0}$ transformer 3, a current-compensated double inductor 4, an integrated circuit 5 that, for example, can be an IEC PEB 2090 as well as of a power supply 6 with a DC/DC converter.

Dependent on coding and pulse repetition rate $f_0$, one distinguishes between the 4B3T system and the 2B1Q system at the $U_{K0}$ interface. The 4B3T system has a pulse repetition rate $f_0$ of 60 kHz and a coding of 4 bits (on 3 ternary symbols). The 2B1Q system, by contrast, exhibits a pulse repetition rate $f_0$ of 40 kHz and a coding of 2 bits onto a quaternary status. These differences have effects on the spectral distribution of the magnetization current of the $U_{K0}$ transformer. This influence on the spectral distribution of the magnetization current can be derived from FIG. 2. As can be seen from FIG. 2, there is a big part of low-frequency components with high current amplitude in the spectrum of the 2B1Q code, by contrast whereto higher-frequency components dominate given 4B3T code. In the case of a $U_{K0}$-4B3T interface, the line length between the transformers can amount to up to 5 km. Given the $U_{K0}$-2B1Q interface and the $U_{HDSL}$ interface, the line length between the transformers is usually somewhat less. The error rate of the transmitted $\cos^2$-shaped pulse must always be below $10^{-7}$.

Added thereto as a complicating factor is that direct currents for remote feed of the terminal subscribers can be superimposed on the information pulses, these amounting to up to 80 mA according to the system under consideration (4B3T, 2B1Q) and even more given HDSL. The supply currents lead to a dc bias $H_{dc}$ of the interface transformer magnetic core whose height is critically determined by the embodiment of the transformer magnetic core and the magnetic core material employed. It is thereby a fundamental condition that the message-oriented characteristics defined in the applicable standards such as pulse and impedance masks must be adhered to even under the maximally possible or, respectively, under changing dc bias.

The following demands are made of the interface transformers utilized at both sides of the link:

d) minimal structural volume, e) suitability for the transmission code systems,
   4B3T-$U_{K0}$ (see FZT 1 TR 220 and ETSI Standard ETR 80; 60 kHz, 120 kBaud)
   2B1Q-$U_{K0}$ (see ANSI-T1.601 and ETSI Standard ETR 80; 40 kHz, 80 baud)
   2B1Q and CAP-HDSL (see ETSI Standard ETR 152; 2 Mbit/sec), f) main inductances 1 through 80 mH dependent on the wired integrated circuit, g) dc superimposition of the remote feed,
   0 through 60 mA given 4B3T interface transformers
   0 through 80 mA given 2B1Q interface transformers (at liberty according to attraction standard)

h) transmission range>800 km (given 4B3T) or, respectively, 15 loops according to ANSI (given 2B1Q), i) low core weight and SMD (surface mounted device) capability.

Up to now, ferrite have been employed as material for the transformer cores, ferrites of the ferrite materials N27 and N28 having been particularly utilized. The required dc biasability was thereby achieved by means of shearing with slots of the ferrite ring cores. As a result of this great shearing of the magnetic circuit. The originally non-linear BH loop of the ferrite material is so highly linearized that the transformer satisfies the required range or thereby, bit error rate. The disadvantage is that the shearing causes a decrease of the effectively active permeability down to values around 200. In order to achieve the required main inductance of 1 through 80 mH, however, the volume must be designed very large as a result of the design given ferrite ring cores.

It has also proven a disadvantage given the employment of ferrite ring cores that high numbers of turns of the winding of the primary side and secondary side are required that can lead to ohmic losses and capacitatively cause noise effects.

Further, European Application 0 378 823 discloses an interface transformer for an $S_0$ interface that comprises a magnetic core of an amorphous cobalt-based alloy with a permeability between 25 000 and 95 000. The anisotropy energies of the alloys known from European Application 0 378 823 lie in the area of $5 J/m^3$.

The magnetic cores disclosed by European Application 0 378 823 are only suited for interfaces with a dc bias in the area of 10 mA and a transmission range of up to 150 m.

SUMMARY OF THE INVENTION

It is an object of the present invention to provide a dc biasable interface transformer for a digital transmission system that exhibits an optimally small structural volume and that, given a simple winding structure and low number of turns, assures a high, error-free transmission range in the area of a few kilometers and a dc biasability up to 100 mA, as well as to provide a method for the manufacture of a toroidal tape core for such an interface transformer.

This object is inventively achieved by a dc biasable interface transformer with a main inductance of 2 through 80 mH and a low coupling capacitance for a digital transmission system having a magnetic core with primary and secondary windings that is characterized in that the magnetic core is composed of a soft magnetic, at least up to 70% amorphous alloy with a flat, linear BH loop, and that the alloy has a composition according to the formula

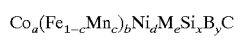

wherein M is one or more elements from the set V, Nb, Ta, Cr, Mo, W, Ge, P, the indices a through z are indicated in atom % and meet the following conditions:

$40 \leq a \leq 82$     $0 \leq e \leq 5$
$3 \leq b \leq 10$     $0 \leq x \leq 15$
$0 \leq c \leq 1$     $8 \leq y \leq 26$
$0 \leq d \leq 30$     $0 \leq z \leq 3$ with the criterion $15 < e + x + y + z < 30$.

By employing this amorphous ferromagnetic material, magnetic cores for interface transformers can be manufactured that are distinguished by a very small structural volume. Given these metallic magnetic cores, further, a high number of turns can be foregone, so that no noteworthy ohmic losses and capacitatively caused noise effects can occur.

Alloys that comprise the aforementioned composition with the following conditions have proven quite especially suited:

$50 \leq a \leq 82$     $e \leq 3$
$c \leq 0.5$     $x \geq 1$
$d \leq 20$     $y \leq 20$ with the criterion $18 < e + x + y + z < 25$.

DESCRIPTION OF THE PREFERRED EMBODIMENTS

In a preferred embodiment of the present invention, a toroidal core, particularly a toroidal tape core, is provided as magnetic core. Due to the particular, initially cited properties of the metallic alloy, this toroidal tape core need not be slotted. In a preferred embodiment, accordingly, the toroidal tape core is an unslotted toroidal tape core.

The tape of the toroidal tape core of the present invention preferably exhibits an average surface roughness $R_a$ of the upper tape side and lower tape side of less than 8% of the tape thickness.

Figure 3:
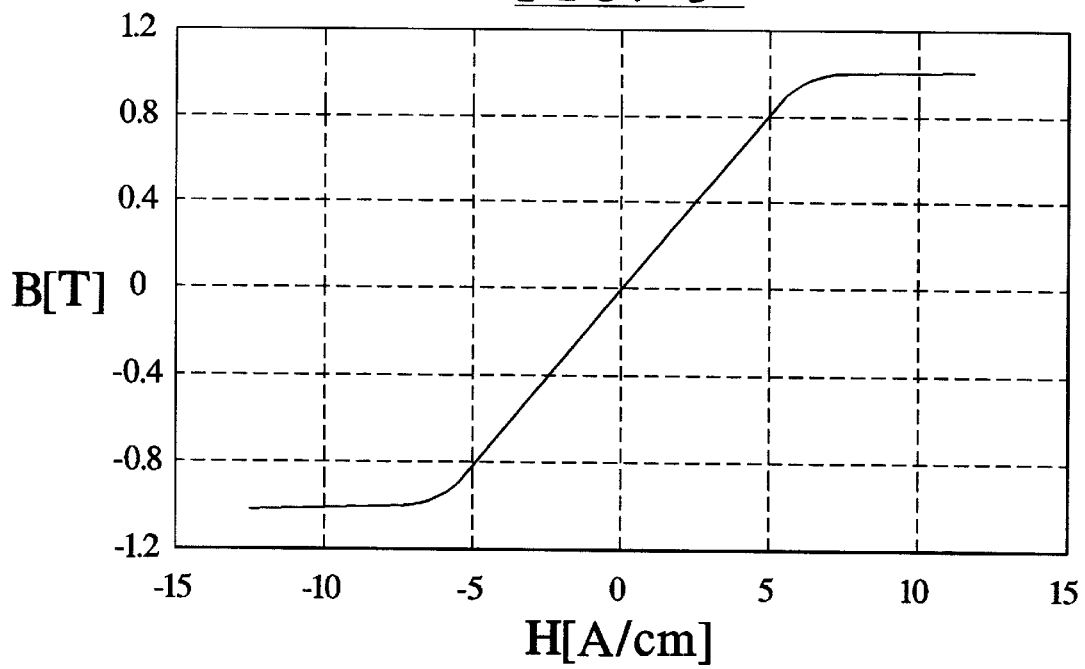
FIG. 3 shows a linear BH curve achieved in a pulse transformer in accordance with the invention.

The invention is based on the perception that the interface transformer properties can be achieved best with an amorphous, nearly magnetostriction-free cobalt-based alloy that has a saturation induction of at least 0.7 Tesla, preferably more than 0.8 Tesla, and has a BH loop and that exhibits a linear curve up to field strengths of at least 1 A/cm, preferably more than 2 A/cm. Such a BH loop is shown in FIG. 3. Such linear BH loops can be achieved, for example, by the manufacturing method steps described below.

An amorphous ferromagnetic tape is cast from a melt by rapid quenching, whereby the composition is selected as described above. The method of rapid quenching or, respectively, continuous casting with rapid quenching is adequately known. The fundamental method steps and apparatus thereby employed are disclosed in detail, for example, in German PS 37 31 781. The subject matter of this document is herewith expressly incorporated into the present application (incorporated by reference).

Subsequently, the soft-magnetic amorphous tape is wound tension-free on a specific machine to form a toroidal core. The setting of the magnetic properties, i.e. of the linear, flat BH loop of the magnetic core, then ensues with a specific thermal treatment in a magnetic field that resides parallel to the rotational symmetry axis of a toroidal tape core, i.e. perpendicular to the tape direction.

The thermal treatment is then undertaken such that the value of the saturation magnetostriction $\lambda_s$ changes in positive direction during the thermal treatment by an amount dependent on the alloy composition until it lies in the range $|\lambda_s| < 0.5$ ppm, preferably $|\lambda_s| < 0.1$ ppm. As can be derived from Table 2, this can also be achieved when the amount of $\lambda_s$ in the as quenched condition of the tape lies clearly above this value. Dependent on the alloy utilized, a rinsing of the magnetic core with air, a reducing or a passive protective atmosphere is thereby important so that neither oxidations nor other reactions can occur at the tape surfaces. Dependent on the alloy composition employed, the cores are heated under an applied magnetic field to temperatures between 220° C. and 400° C. with a rate of 1 to 10 K/min, are held between 0.5 and 48 hours in the applied magnetic field in this temperature interval and are subsequently in turn cooled with 0.1 to 5 K/min.

Subsequently, the cores are surface-passivated, coated, eddy-sintered or encapsulated in a vat, provided with the primary and, respectively, secondary windings and potentially glued or cast in the component housing.

The core dimensions or, respectively, core masses that can be achieved with the present invention given predetermined main inductances and dc loadabilities can be derived from the following Table 1.

TABLE 1

| $L_{main}$ [mH] | $I_{dc,max}$ [mA] | Core Dimension [mm$^3$] | Core Mass [g] |
|---|---|---|---|
| 5.2 | 100 | 9.8 × 6.5 × 4.5 | 1.19 |
| 5.2 | 60 | 7.4 × 5.0 × 3.0 | 0.45 |
| 5.2 | 44 | 7.0 × 5.0 × 2.0 | 0.24 |
| 6.0 | 80 | 9.8 × 6.5 × 4.5 | 1.18 |
| 7.0 | 60 | 9.8 × 6.5 × 4.5 | 1.18 |
| 10 | 60 | 8.2 × 5.0 × 4.0 | 0.84 |
| 10 | 35 | 8.0 × 6.0 × 2.0 | 0.28 |
| 13 | 60 | 9.0 × 5.0 × 4.0 | 1.12 |
| 13 | 33 | 8.0 × 6.0 × 2.5 | 0.35 |
| 26 | 60 | 11.0 × 6.5 × 5.7 | 2.24 |
| 26 | 30 | 7.5 × 5.5 × 4.5 | 0.58 |
| 50 | 60 | 14.0 × 6.5 × 5.7 | 4.37 |
| 50 | 30 | 9.6 × 6.5 × 4.5 | 1.12 |
| 60 | 60 | 17.0 × 6.5 × 5.7 | 7.01 |
| 80 | 30 | 10.1 × 5.0 × 4.5 | 1.73 |

| The relationship |
| --- |
| $L = N^2\, \mu_o \mu_r A_{fe}/l_{fe}$ |
| N = number of turns |
| $\mu_o$ = universal permeability constant |
| $\mu_r$ = permeability of the material |
| $A_{fe}$ = iron crossection of the core |
| $l_{fe}$ = iron path length of the core |
| applies for the inductance of the transformer. |

It can be seen from Eq. (1) that the required inductance given minimal structural volume is only achieved when number of turns, permeability, core crossection and iron path length are matched to one another. In addition to the favorable annular geometry, the permeability of the core material is the determining parameter for an optimally compact dimensioning of the transformer. Given the alloys coming into consideration, $\mu_r$ lies between 500 and 5000 dependent on the implemented transverse field thermal treatment. Compared to a slotted ferrite core with $\mu_r$=100–400, a great volume advantage arises due to the selected toroidal core design even given a low $\mu$ value of 500.

Figure 4:
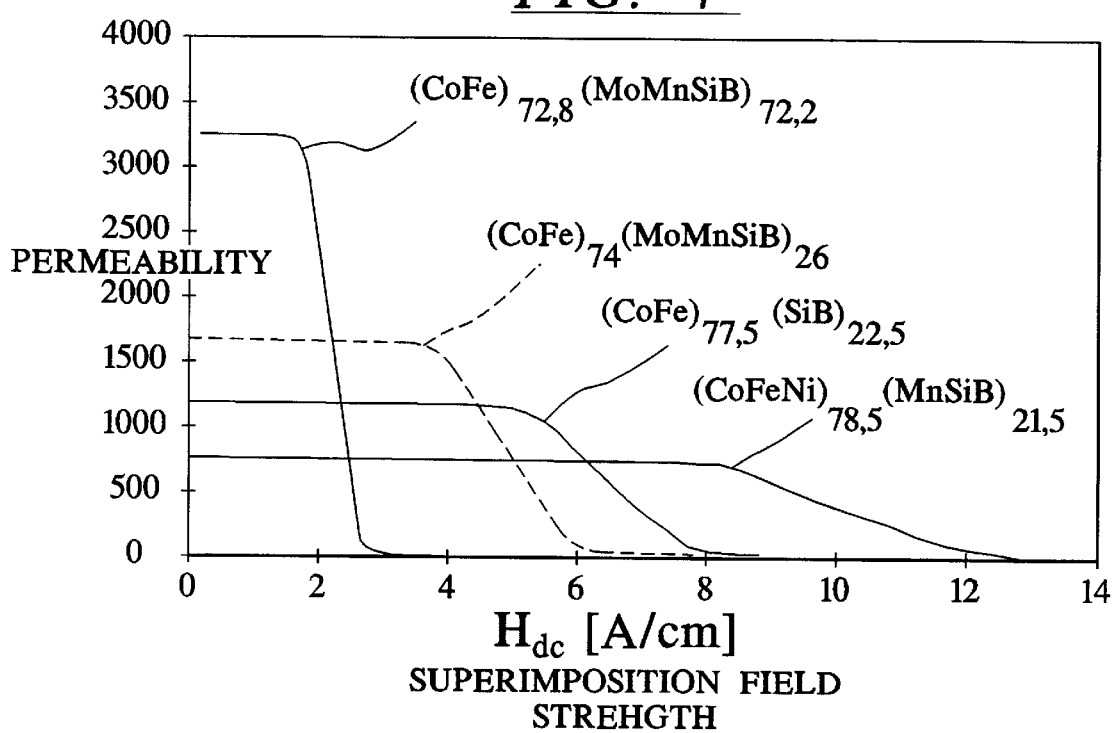
FIG. 4 shows the superimposition field strength versus the permeability for various amorphous materials for $U_{K0}$ transformers.

A fundamental limitation in the selection of the core material already arises in that a direct current for remote feed of the subscriber equipment is superimposed on the information signal to be transmitted; this can typically amount to up to $I_{dc}$=60 mA given 4B3T transformers. This direct current leads to a dc bias $$H_{dc} = I_{dc} N / l_{fe}$$

under which the permeability dare drop only very slightly. For this reason, the evaluation of the material ensues on the basis of $\mu(H_{dc})$ characteristics as shown by way of example in FIG. 4 for various amorphous materials developed for $U_{K0}$ transformers.

So that the transformer can adhere to the range achieved with the echo compensation method in conformity with the standards, the $\mu(H_{dc})$ characteristic must proceed with adequate constancy. From which range and which form of the $\mu(H_{dc})$ characteristic must form the basis here is thereby dependent on the amplitude of the signal to be transmitted.

Figure 1:
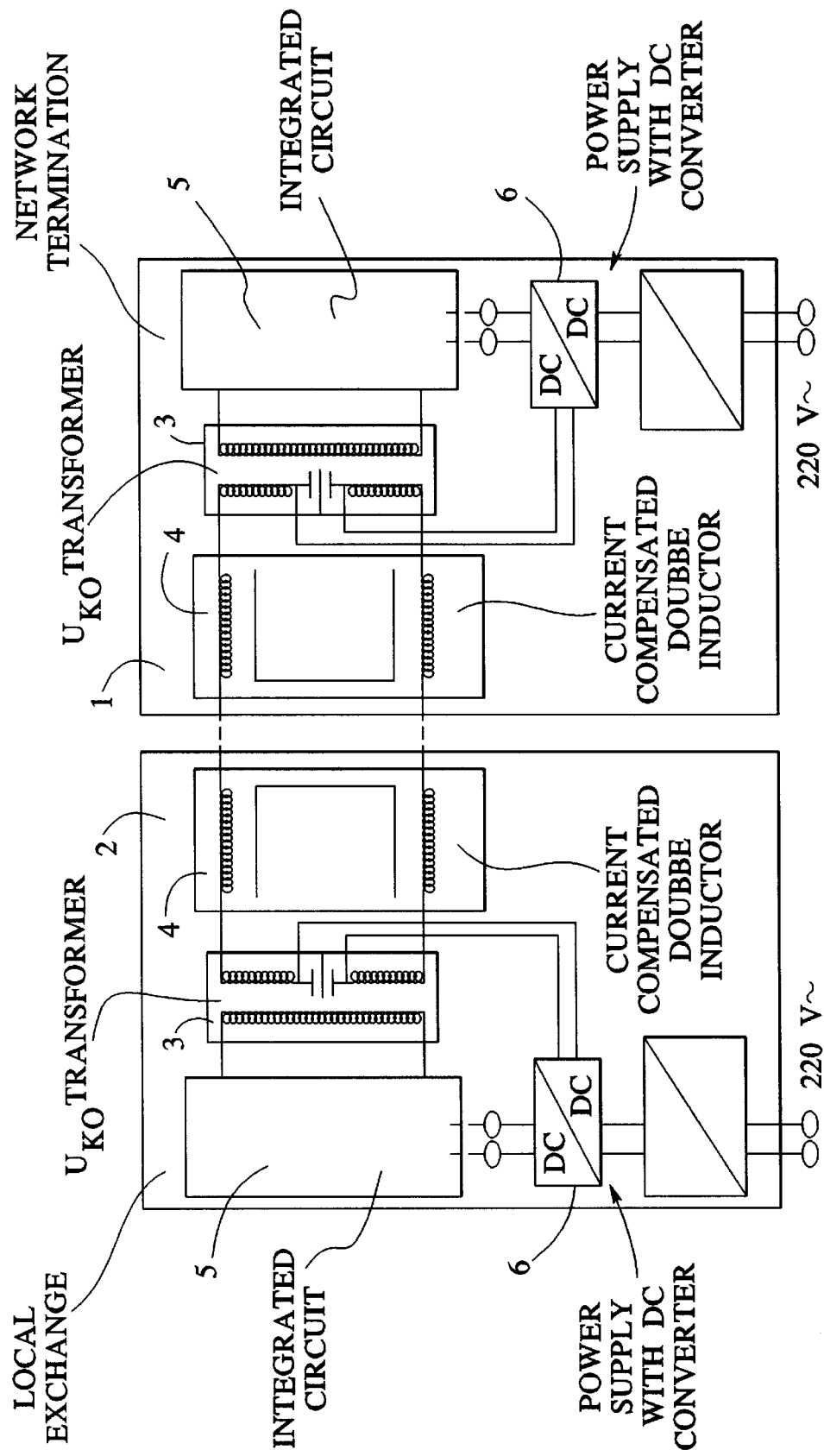
FIG. 1, as noted above, is a block diagram of a conventional ISDN telecommunication system, in which a pulse transformer according to the present invention can be utilized.
Figure 2:
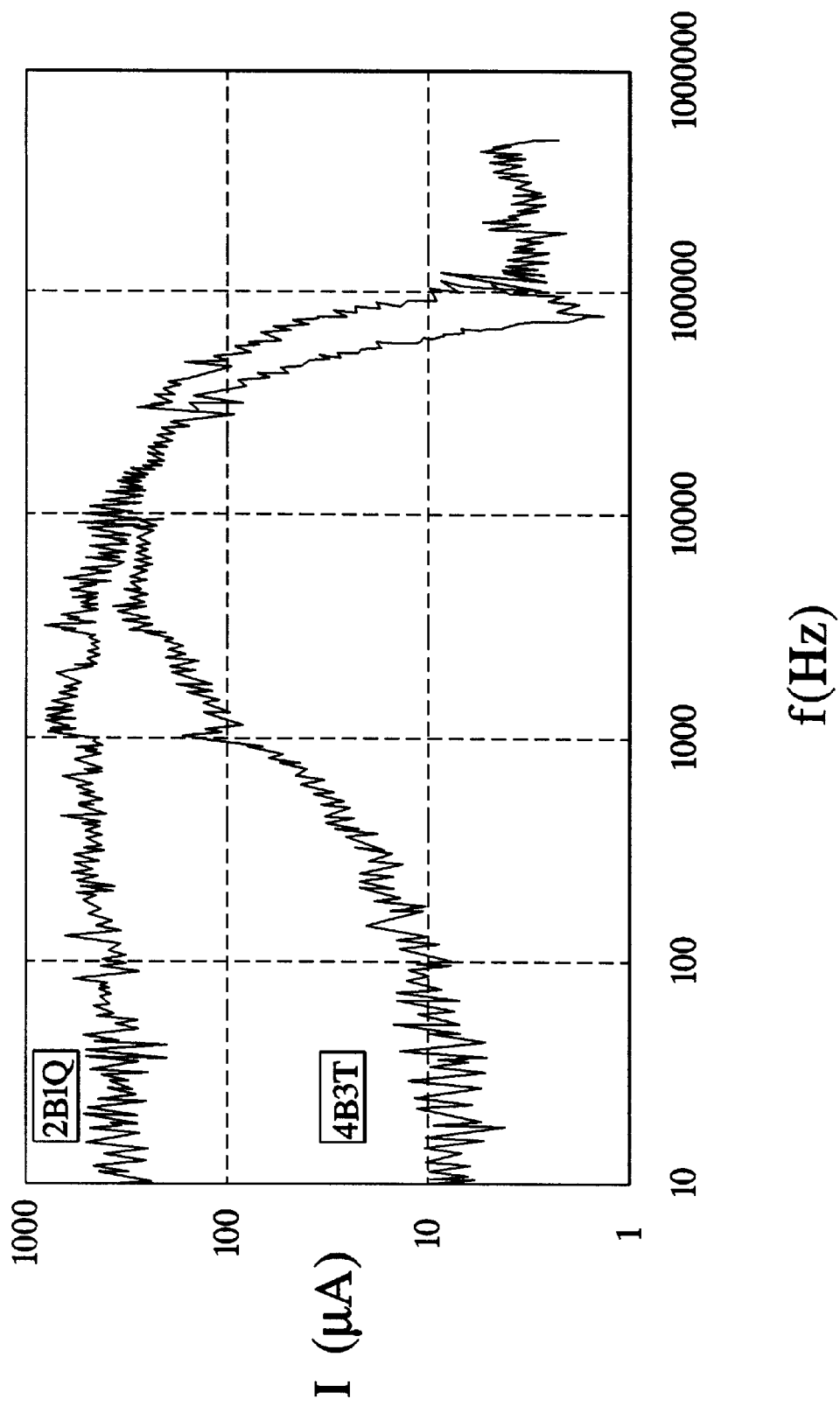
FIG. 2, as noted above, shows the spectral distribution of the magnetization current in a conventional transformer of the type currently utilized in an ISDN telecommunication system exemplified by FIG. 1.
Figure 5A:
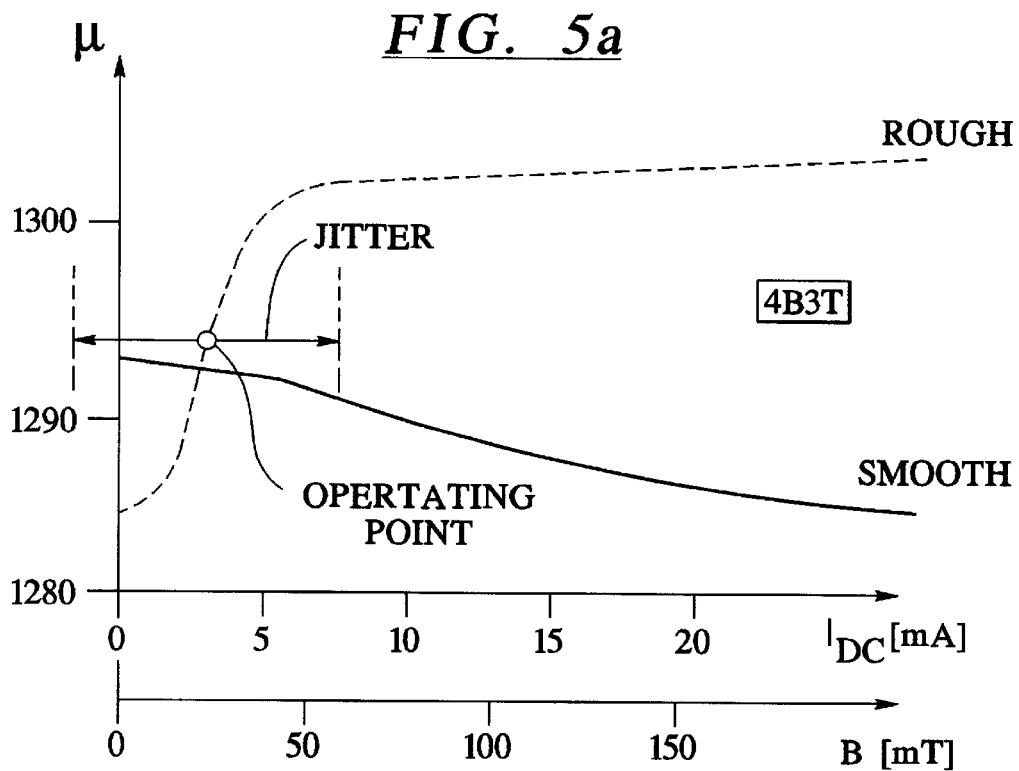
FIG. 5a shows the characteristic relationship between permeability and current, and between current and magnetic field, for two 4B3T transformers having core materials with different surface qualities, for low modulations.

As proceeds from FIG. 2, the low-frequency parts of the 4B3T spectrum are not very pronounced. Accordingly, the position of the operating point of the higher-frequency payload signal is only slightly influenced by the high-amplitude low-frequency jitter. Instead, internal low-frequency disturbances of the circuit, for example the clock frequency of the DC—DC converter (see FIG. 1) usually present in the user circuit, in addition to the dc bias determine the position of the operating point of the signal on the $\mu(H_{dc})$ characteristic and its jitter. The relationships for two 4B3T transformers of core materials with different surface qualities are shown in FIG. 5a for low modulations. Since the amplitude of the low-frequency noise signal is relatively small, the characteristic of the small field region plays the decisive part here given the curve form of the $\mu(H_{dc})$ characteristic belonging to small modulations. This proceeds practically horizontally in amorphous cores as long as the tape is adequately smooth (FIG. 5a, solid-line curve),
the tape is not crystallized in an uncontrolled way,
the transverse anisotropy generated with transverse field tempering lies exactly parallel to the core axis,
the saturation magnetostriction practically disappears,
the core is wound tension-free.

When, by contrast, said conditions are inadequately adhered to, then a trough grows in the characteristic (FIG. 5a, broken-line curve) as a consequence of magnetic aftereffect, this becoming deeper and deeper with increasing deviation from the ideal condition. The modulation of the operating point due to low-frequency noise signals then leads to a distortion of the code to be transmitted, as a result whereof bit errors arise due to disturbance of the echo compensation.

Figure 5B:
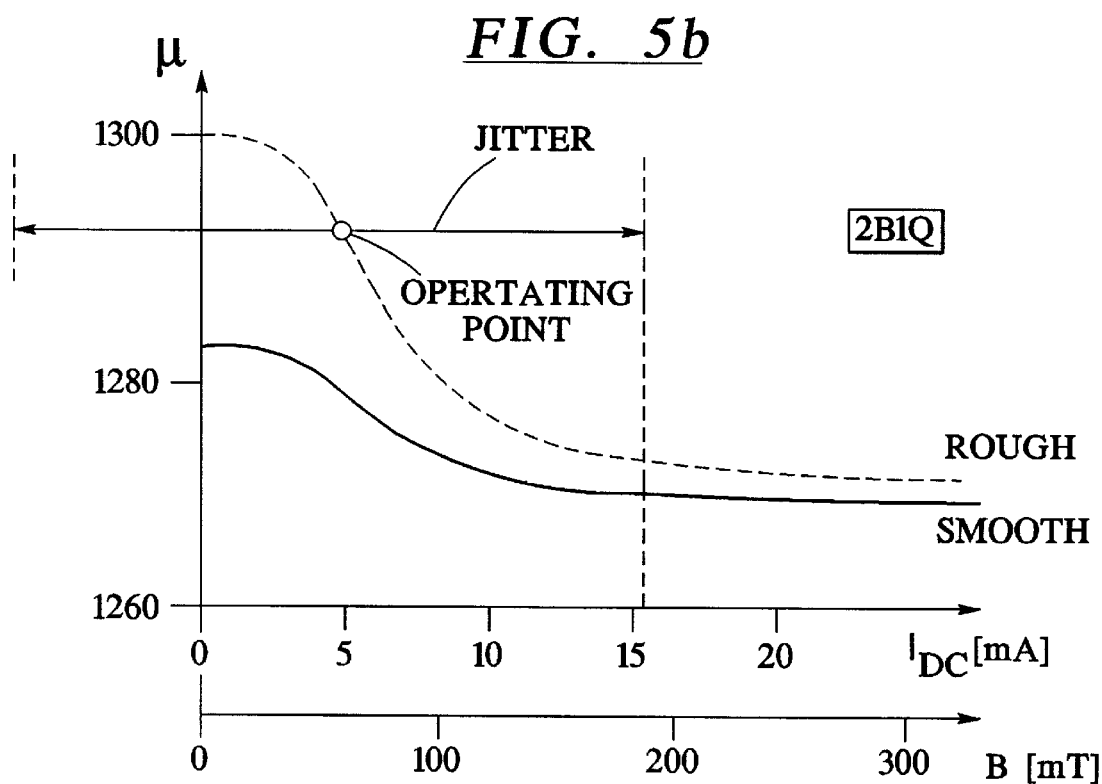
FIG. 5b shows the characteristic relationship between permeability and current, and between current and magnetic field, for two 2B1Q transformers having core materials with different surface qualities, for low modulations.

The conditions for the 2B1Q code are shown in FIG. 5b. Due to the significantly greater modulation of the transformer core, the curved course in the small field region according to FIG. 5a (broken-line curve) is averaged out and loses in significance. Instead, the curves of the characteristic according to FIG. 5b valid for big modulations determined the transmission behavior. The influence of the aforementioned manufacturing conditions and material properties thereby enters into the curve of the characteristic in the way shown therein. When the operating point is located in the steep region of one of the characteristics in FIG. 5b, then, dependent on the surface quality, the conditions for the signal transmission (40–60 kHz) are more or less greatly influenced by a jitter generated by low-frequency signal parts.

Adequately good bit error rates, which ultimately determine the range of the transformer, can be achieved when 1) The amount of the saturation magnetostriction $\lambda_s$ of the tempered magnetic core or tape is at least smaller than $0.5 \times 10^{-6}$ (preferably $<0.1 \times 10^{-6}$) and the core is wound tension-free.

2) The common average surface roughness $R_2$ (according to DIN 4762) of the upper tape side and lower tape side at least amounts to less than 8% of the tape thickness, preferably less than 2.5%.

3) The crystallization temperature determined by DSC (heating rate 10 K/min) lies above 410° C., preferably above 430° C.

4) The trough in the characteristic in FIG. 5a given 4B3T code is flattened by intentional over-modulation, which is possible by an optimally tight design of the core volume. Given 2B1Q code, by contrast, optimally large core volumes are desired in order to weaken the effect of the steep region of the characteristic in FIG. 5b.

5) The disturbing influence of radial stray fields is kept as low as possible in the field tempering. Measures, for example, are the formation of adequately long core stacks in field direction, shielding against external fields, avoiding tilting of the axis of the core stack from the symmetry axis of the field.

6) Reduction of the magnetic aftereffect as well as the disturbing influences occurring given higher modulations by dismantling the "free volume" typical of amorphous alloys by special management of the thermal treatment.

7) Reducing the influences of the magnetic aftereffect as well as of the disturbing influences occurring given higher modulations by dismantling an optimally high anisotropy energy $K_u$. Since, according to FIG. 4, the usable constant working range of the $\mu(H_{dc})$ characteristic is dependent on the size of the anisotropy field strength $$H_a = B_s / (\mu_o^* \mu_r),$$

the alloy composition must be determined such in combination with the transverse field tempering that, on the one hand, the saturation induction os optimally high and, on the other hand, the permeability is optimally low. Since according to Eq. (1), however, an especially low permeability must be compensated with an increase in the number of turns N, a compromise of high anisotropy field strength and adequately high permeability must be found in the alloy selection and thermal treatment.

While observing the aforementioned conditions, transformer cores with especially liner hysteresis loops that have all properties conforming to the standards can be manufactured with the inventive alloy system. Cores having especially good properties derive when the alloy contains optimally little Mn, has a second ferromagnetic component such as, for example, Ni in the alloy and/or has a crystallization temperature that lies above 430° C. (measured with DSC, heating rate 10 K/min).

EXAMPLES

The aforementioned demands and alloy ranges are met after suitable thermal treatment by, for example, the alloys recited in Table 2 or by the alloy core combinations recited in Table 3.

Although modifications and changes may be suggested by those skilled in the art, it is the intention of the inventors to embody within the patent warranted hereon all changes and modifications as reasonably and properly come within the scope of their contribution to the art.

We claim as our invention:

1. DC biasable interface transformer with a main inductance from 2 to 80 mH and a slight coupling capacitance for a digital transmission system having a magnetic core with primary and secondary windings, said magnetic core being composed of a soft magnetic, at least 70% amorphous alloy with a flat, substantially linear BH loop, and a composition according to the formula $$Co_a(Fe_{1-c}Mn_c)_b Ni_d M_e Si_x B_y C_z,$$

wherein M is at least one element selected from the group consisting of V, Nb, Ta, Cr, Mo, W, Ce, P and a b, c, d, e, x, y and z are atom % and meet the following conditions:

TABLE 2

| Alloy [at %] | Saturation induction [T] | Anisotropy field strength $H_a$[A/cm] | Saturation magnetostriction $\lambda$ as quenched | Saturation magnetostriction $\lambda$ tempered | Crystallization temperature [° C.] |
|---|---|---|---|---|---|
| $Co_{71.7}Fe_{1.1}Mo_1Mn_4Si_{13.2}B_9$ | 0.82 | 1.5 | $-12*10^{-8}$ | $-3.5*10^{-8}$ | 480 |
| $Co_{72.5}Fe_{1.5}Mo_{0.2}Mn_4Si_{4.8}B_{17}$ | 1.0 | 3.5 | $-12*10^{-8}$ | $-4.1*10^{-8}$ | 470 |
| $Co_{72.8}Fe_{4.7}Si_{5.5}B_{17}$ | 0.99 | 4.8 | $-32*10^{-8}$ | $-1.6*10^{-8}$ | 500 |
| $Co_{55.6}Fe_{6.1}Mn_{1.1}Si_{4.3}B_{16.2}Ni_{16.5}$ | 0.93 | 8.0 | $-110*10^{-8}$ | $+4.2*10^{-8}$ | 432 |

TABLE 3

| $I_{main}$ [mH] | $I_{dc,max}$ [mA] | Alloy | Core dimension [mm³] | Core mass [g] | Number of turns |
|---|---|---|---|---|---|
| 5.2 | 80 | $Co_{72.8}Fe_{4.7}Si_{5.5}B_{17}$ | 9.8 × 6.5 × 4.5 | 1.18 | 2 × 62 |
| 5.2 | 100 | $Co_{55.6}Fe_{6.1}Mn_{1.1}Si_{4.3}B_{18.2}Ni_{16.5}$ | 9.8 × 6.5 × 4.5 | 1.19 | 2 × 78 |
| 5.2 | 60 | $Co_{72.8}Fe_{4.7}Si_{5.5}B_{17}$ | 8.2 × 5.0 × 3.0 | 0.63 | 2 × 69 |
| 5.2 | 60 | $Co_{55.6}Fe_{6.1}Mn_{1.1}Si_{4.3}B_{16.2}Ni_{16.5}$ | 7.4 × 5.0 × 3.0 | 0.45 | 2 × 97 |
| 5.2 | 37 | $Co_{72.8}Fe_{4.7}Si_{5.5}B_{17}$ | 7.0 × 5.0 × 2.0 | 0.24 | 2 × 101 |
| 5.2 | 44 | $Co_{55.6}Fe_{6.1}Mn_{1.1}Si_{4.3}B_{16.2}Ni_{16.5}$ | 7.0 × 5.0 × 2.0 | 0.24 | 2 × 128 |
| 6.0 | 80 | $Co_{72.5}Fe_{1.5}Mo_{0.2}Mn_4Si_{4.8}B_{17}$ | 9.8 × 6.5 × 4.5 | 1.18 | 2 × 60 |
| 6.0 | 60 | $Co_{72.5}Fe_{1.5}Mo_{0.2}Mn_4Si_{4.8}B_{17}$ | 12.0 × 6.0 × 1.5 | 0.81 | 2 × 80 |
| 6.5 | 60 | $Co_{71.7}Fe_{1.1}Mo_1Mn_4Si_{13.2}B_9$ | 11.0 × 6.5 × 5.3 | 2.08 | 2 × 37 |
| 7.0 | 60 | $Co_{72.8}Fe_{4.7}Si_{5.5}B_{17}$ | 9.8 × 6.5 × 4.5 | 1.18 | 2 × 74 |
| 10 | 60 | $Co_{72.8}Fe_{4.7}Si_{5.5}B_{17}$ | 9.2 × 5.0 × 4.0 | 1.18 | 2 × 75 |
| 10 | 60 | $Co_{55.6}Fe_{6.1}Mn_{1.1}Si_{4.3}B_{16.2}Ni_{16.5}$ | 8.2 × 5.0 × 4.0 | 0.84 | 2 × 104 |
| 10 | 36 | $Co_{72.8}Fe_{4.7}Si_{5.5}B_{17}$ | 7.0 × 5.0 × 3.5 | 0.42 | 2 × 106 |
| 10 | 35 | $Co_{55.6}Fe_{6.1}Mn_{1.1}Si_{4.3}B_{16.2}Ni_{16.5}$ | 8.0 × 6.0 × 2.0 | 0.28 | 2 × 191 |
| 13 | 60 | $Co_{72.8}Fe_{4.7}Si_{5.5}B_{17}$ | 10.1 × 5.0 × 4.0 | 1.53 | 2 × 80 |
| 13 | 60 | $Co_{55.6}Fe_{6.1}Mn_{1.1}Si_{4.3}B_{16.2}Ni_{16.5}$ | 9.0 × 5.0 × 4.0 | 1.12 | 2 × 109 |
| 13 | 34 | $Co_{72.8}Fe_{4.7}Si_{5.5}B_{17}$ | 7.0 × 5.0 × 4.0 | 0.48 | 2 × 113 |
| 13 | 33 | $Co_{55.6}Fe_{6.1}Mn_{1.1}Si_{4.3}B_{16.2}Ni_{16.5}$ | 8.0 × 6.0 × 2.5 | 0.35 | 2 × 193 |
| 26 | 60 | $Co_{55.6}Fe_{6.1}Mn_{1.1}Si_{4.3}B_{16.2}Ni_{16.5}$ | 11.0 × 6.5 × 5.7 | 2.24 | 2 × 200 |
| 26 | 30 | $Co_{55.6}Fe_{6.1}Mn_{1.1}Si_{4.3}B_{16.2}Ni_{16.5}$ | 7.5 × 5.5 × 4.5 | 0.58 | 2 × 206 |
| 50 | 60 | $Co_{55.6}Fe_{6.1}Mn_{1.1}Si_{4.3}B_{16.2}Ni_{16.5}$ | 14.0 × 6.5 × 5.7 | 4.37 | 2 × 168 |
| 50 | 30 | $Co_{55.6}Fe_{6.1}Mn_{1.1}Si_{4.3}B_{16.2}Ni_{16.5}$ | 9.6 × 6.5 × 4.5 | 1.12 | 2 × 184 |
| 80 | 60 | $Co_{55.6}Fe_{6.1}Mn_{1.1}Si_{4.3}B_{16.2}Ni_{16.5}$ | 17.0 × 6.5 × 5.7 | 7.01 | 2 × 152 |
| 80 | 30 | $Co_{55.6}Fe_{6.1}Mn_{1.1}Si_{4.3}B_{16.2}Ni_{16.5}$ | 10.1 × 5.0 × 4.5 | 1.73 | 2 × 139 |
| 80 | 30 | $Co_{71.7}Fe_{1.1}Mo_1Mn_4Si_{13.2}B_9$ | 20.0 × 12.5 × 8.0 | 9.72 | 2 × 110 |

$$40 \le a \le 82 \qquad 0 \le e \le 5$$
$$3 \le b \le 10 \qquad 0 \le x \le 15$$
$$0 \le c \le 1 \qquad 8 \le y \le 26$$
$$0 \le d \le 30 \qquad 0 \le z \le 3$$

with $15 < e + x + y + z < 30$, said magnetic core being a toroidal tape core having a tape with an average surface roughness $R_a$ of an upper tape side and a lower tape side of less than 8% of a thickness of said tape.

2. DC biasable interface transformer according to claim 1, wherein said alloy composition that satisfies the following conditions:

$$50 \le a \le 82 \qquad e \le 3$$
$$c \le 0.5 \qquad x \ge 1$$
$$d \le 20 \qquad y \le 20$$

with $18 < e + x + y + z < 25$.

3. DC biasable interface transformer according to claim 1 wherein the toroidal tape core is unslotted.

4. DC biasable interface transformer according to claim 1 wherein said toroidal tape core has dimensions smaller than 20 mm×12.5 mm×10 mm.

5. DC biasable interface transformer according to claim 1 wherein said average surface roughness $R_a$ of said upper tape side and said lower tape side is less than 2.5% of said thickness.

6. DC biasable interface transformer according to claim 1 $|\lambda_S|<0.5$ ppm.

7. DC biasable interface transformer according to claim 6, wherein $|\lambda_S|<0.1$ ppm.

8. DC biasable interface transformer according to claim 1 wherein said alloy has a crystallization temperature above 410° C.

* * * * *